(12) United States Patent
Sethi et al.

(10) Patent No.: US 11,513,925 B2
(45) Date of Patent: Nov. 29, 2022

(54) ARTIFICIAL INTELLIGENCE-BASED REDUNDANCY MANAGEMENT FRAMEWORK

(71) Applicant: EMC IP Holding Company LLC, Hopkinton, MA (US)

(72) Inventors: Parminder Singh Sethi, Punjab (IN); Bijan K. Mohanty, Austin, TX (US); Hung T. Dinh, Austin, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 331 days.

(21) Appl. No.: 16/910,212

(22) Filed: Jun. 24, 2020

(65) Prior Publication Data
US 2021/0406140 A1    Dec. 30, 2021

(51) Int. Cl.
*G06F 11/20*    (2006.01)
*G06K 9/62*    (2022.01)
(Continued)

(52) U.S. Cl.
CPC ...... *G06F 11/2025* (2013.01); *G06F 11/3476* (2013.01); *G06K 9/6256* (2013.01); (Continued)

(58) Field of Classification Search
CPC .............. H04L 41/149; H04L 67/1034; H04L 41/0668; H04L 41/0816; H04L 41/0886; H04L 41/08; H04L 41/0893; H04L 41/145; H04L 41/14; H04L 43/0823; H04L 67/12; H04L 41/147; H04L 41/16; H04L 43/0817; G06F 11/2025; G06F 11/20; G06F 11/3476; G06F 11/14; G06F 11/2205; G06F 11/34; G06F 11/3447; G06F 11/3006; G06F 9/46; G06F 9/50; G06F 11/30; G06K 9/6256; G06K 9/62; G06K 9/6278; G06K 9/6271; G06N 3/0472; G06N 3/04; G06N 7/005; G06N 7/00; G06N 3/08; G06N 3/0445
See application file for complete search history.

(56) References Cited

U.S. PATENT DOCUMENTS

9,477,772 B2    10/2016    Meadway et al.
9,697,096 B2    7/2017    Kopetz
(Continued)

*Primary Examiner* — Huyen X Vo
(74) *Attorney, Agent, or Firm* — Ryan, Mason & Lewis, LLP (57) ABSTRACT

Methods, apparatus, and processor-readable storage media for artificial intelligence-based redundancy management are provided herein. An example computer-implemented method includes obtaining telemetry data from one or more client devices within at least one system; predicting one or more hardware component failures in at least a portion of the one or more client devices within the at least one system by processing at least a portion of the telemetry data using a first set of one or more artificial intelligence techniques; determining, using a second set of one or more artificial intelligence techniques, one or more redundant hardware components for implementation in connection with the one or more predicted hardware component failures; and performing at least one automated action based at least in part on the one or more redundant hardware components.

20 Claims, 9 Drawing Sheets

(51) Int. Cl.
*H04L 67/1034* (2022.01)
*G06N 3/04* (2006.01)
*G06F 11/34* (2006.01)
*G06N 7/00* (2006.01)

(52) U.S. Cl.
CPC ......... *G06K 9/6278* (2013.01); *G06N 3/0472* (2013.01); *G06N 7/005* (2013.01); *H04L 67/1034* (2013.01)

(56) References Cited

U.S. PATENT DOCUMENTS

| | | | |
|---|---|---|---|
| 10,326,701 B2 | 6/2019 | Jain et al. | |
| 2008/0126854 A1* | 5/2008 | Anderson | G06F 11/203 714/13 |
| 2013/0073744 A1 | 3/2013 | Ratica | |
| 2018/0314981 A1* | 11/2018 | Chen | G06F 9/5072 |
| 2018/0341248 A1* | 11/2018 | Mehr | B22F 10/00 |
| 2020/0311559 A1* | 10/2020 | Chattopadhyay | G06N 5/04 |

* cited by examiner

FIG. 1

```
# importing required libraries
import pandas as pd
from sklearn.naive_bayes import BernoulliNB
from sklearn.metrics import accuracy_score
from sklearn.cross_validation import train_test_split read the train and test dataset
train_data = pd.read_csv('train-data.csv')
test_data = pd.read_csv('test-data.csv')

# shape of the dataset
print('Shape of training data :',train_data.shape)
print('Shape of testing data :',test_data.shape)

# Now, we need to predict the missing target variable in the test data
target variable - Survived separate the independent and target variable on training data
train_x = train_data.drop(columns=['Failed'],axis=1)
train_y = train_data['Failed']

# separate the independent and target variable on testing data
test_x = test_data.drop(columns=['Failed'],axis=1)
test_y = test_data['Failed']

model = BernoulliNB(binarize = 0.1)
```

FIG. 2

```
# fit the model with the training data
model.fit(train_x,train_y)

# predict the target on the train dataset
predict_train = model.predict(train_x)
print('Target on train data',predict_train)

# Accuracy Score on train dataset
accuracy_train = accuracy_score(train_y,predict_train)
print('accuracy_score on train dataset : ', accuracy_train)

# predict the target on the test dataset
predict_test = model.predict(test_x)
print('Target on test data',predict_test)

# Accuracy Score on test dataset
accuracy_test = accuracy_score(test_y,predict_test)
print('accuracy_score on test dataset : ', accuracy_test)
```

```
from __future__ import print_function
import numpy as np class RbmImpl:
    '''
    This class implements Restricted Boltzmann Machines
    '''
    def __init__(self, num_visible, num_hidden):
        self.num_hidden = num_hidden
        self.num_visible = num_visible
        self.verbose = True
        np_rng = np.random.RandomState(4321)

self.weights = np.asarray(np_rng.uniform(
            low=-4 * np.sqrt(6. / (num_hidden + num_visible)),
            high=4 * np.sqrt(6. / (num_hidden + num_visible)),
            size=(num_visible, num_hidden)))

self.weights = np.insert(self.weights, 0, 0, axis = 0)
        self.weights = np.insert(self.weights, 0, 0, axis = 1)
```

```
def train_rbm(self, data, max_epochs = 2000, learning_rate = 0.1):
    num_examples = data.shape[0]
    data = np.insert(data, 0, 1, axis = 1)

for epoch in range(max_epochs):
        pos_hid_activations = np.dot(data, self.weights)
        pos_hid_probs = self.sigmoid(pos_hid_activations)
        pos_hid_probs[:,0] = 1
        pos_hid_states = pos_hid_probs >
np.random.rand(num_examples,
                self.num_hidden + 1)
        pos_associations = np.dot(data.T, pos_hid_probs)

neg_vis_activations = np.dot(pos_hid_states, self.weights.T)
        neg_vis_probs = self.sigmoid(neg_vis_activations)
        neg_vis_probs[:,0] = 1 neg_hid_activations = np.dot(neg_vis_probs, self.weights)
        neg_hid_probs = self.sigmoid(neg_hid_activations)
        neg_associations = np.dot(neg_vis_probs.T, neg_hid_probs)

self.weights += learning_rate * ((pos_associations -
                        neg_associations) / num_examples)
        error = np.sum((data - neg_vis_probs) ** 2)
        if self.verbose:
            print('Epoch %s: Error is: %s', (epoch, error))

def sigmoid(self, val):
    return 1.0 / (1 + np.exp(-val))

if __name__ == '__main__':
    rbmInstance = RbmImpl(num_visible = 6, num_hidden = 2)
    training_data = np.array([[1,1,1,0,0,0], [1,0,1,0,0,0], [1,1,1,0,0,0],
                    [0,0,1,1,1,0], [0,0,1,1,0,0], [0,0,1,1,1,0]])
    rbmInstance.train_rbm(data = training_data, max_epochs = 5000)
    print('The weights obtained after training are:')
    print(rbmInstance.weights)
```

ARTIFICIAL INTELLIGENCE-BASED REDUNDANCY MANAGEMENT FRAMEWORK

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to redundancy techniques in such systems.

BACKGROUND

Enterprise systems such as servers and storage systems commonly implement various redundancy techniques related to, for example, hardware redundancies for events such as hardware failures. Although sometimes hardware failures are sudden, in many situations, the failures are gradual with various errors and warning signs preceding failure. Redundant components can include, for example, hard disk controllers and/or drives, network interface cards, etc., and are typically incorporated by conventional redundancy approaches based merely on availability. As a result, such conventional redundancy approaches often result in unnecessary hardware dispatches and costs.

SUMMARY

Illustrative embodiments of the disclosure provide an artificial intelligence-based (AI-based) redundancy framework. An exemplary computer-implemented method includes obtaining telemetry data from one or more client devices within at least one system, and predicting one or more hardware component failures in at least a portion of the one or more client devices within the at least one system by processing at least a portion of the telemetry data using a first set of one or more AI techniques. The method also includes determining, using a second set of one or more AI techniques, one or more redundant hardware components for implementation in connection with the one or more predicted hardware component failures, and performing at least one automated action based at least in part on the one or more redundant hardware components.

Illustrative embodiments can provide significant advantages relative to conventional redundancy approaches. For example, problems associated with unnecessary hardware dispatches and costs are overcome in one or more embodiments through predicting hardware component failures and determining corresponding redundant components using artificial intelligence techniques.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
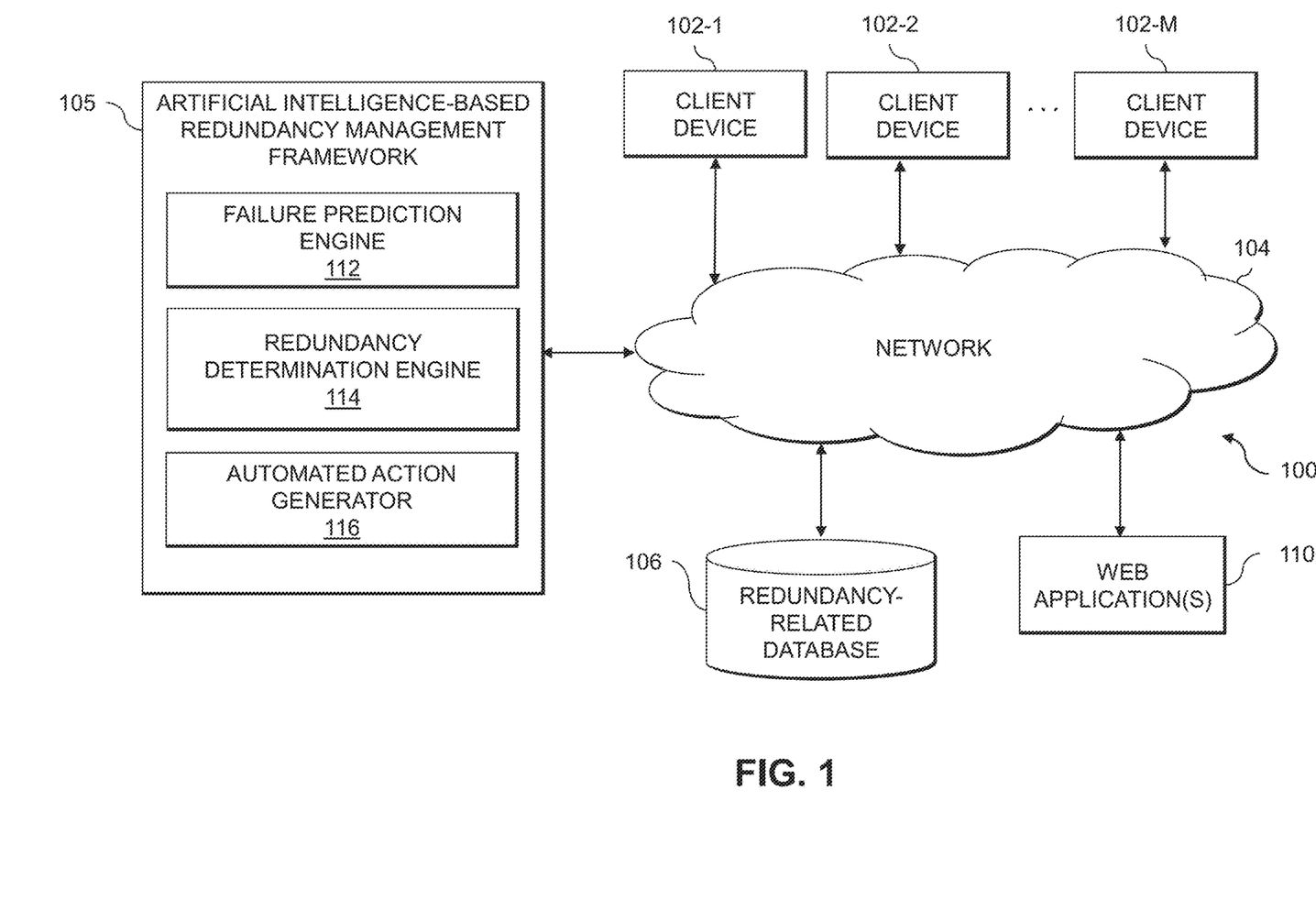
FIG. 1 shows an information processing system configured for AI-based redundancy management in an illustrative embodiment.

FIG. 1 shows a computer network (also referred to herein as an information processing system) 100 configured in accordance with an illustrative embodiment. The computer network 100 comprises a plurality of client devices 102-1, 102-2, . . . 102-M, collectively referred to herein as client devices 102. The client devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is AI-based redundancy management framework 105 and one or more web applications 110 (e.g., one or more customer relationship management (CRM) applications, one or more device monitoring and/or management applications, etc.).

The client devices 102 may comprise, for example, Internet-of-Things (IoT) devices and/or devices containing and/or connected to IoT sensors, wherein such devices can include, for instance, mobile telephones, laptop computers, tablet computers, desktop computers or other types of computing devices. Such devices are examples of what are more generally referred to herein as "processing devices." Some of these processing devices are also generally referred to herein as "computers."

The client devices 102 in some embodiments comprise respective computers associated with a particular company, organization, group of users, or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the AI-based redundancy management framework 105 can have an associated database 106 configured to store data pertaining to redundancy-related information, which comprise, for example, hardware device component configuration information, utilization information, logs, alerts, etc.

The database 106 in the present embodiment is implemented using one or more storage systems associated with the AI-based redundancy management framework 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the AI-based redundancy management framework 105 can be input-output devices, which illustratively comprise keyboards, displays or other types of input-output devices in any combination. Such input-output devices can be used, for example, to support one or more user interfaces to the AI-based redundancy management framework 105, as well as to support communication between the AI-based redundancy management framework 105 and other related systems and devices not explicitly shown.

Also, the AI-based redundancy management framework 105 in the FIG. 1 embodiment is assumed to be implemented using at least one processing device. Each such processing device generally comprises at least one processor and an associated memory, and implements one or more functional modules for controlling certain features of the AI-based redundancy management framework 105.

More particularly, the AI-based redundancy management framework 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs. One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the AI-based redundancy management framework 105 to communicate over the network 104 with the client devices 102, and illustratively comprises one or more conventional transceivers.

The AI-based redundancy management framework 105 further comprises a failure prediction engine 112, a redundancy determination engine 114, and an automated action generator 116.

It is to be appreciated that this particular arrangement of modules 112, 114 and 116 illustrated in the AI-based redundancy management framework 105 of the FIG. 1 embodiment is presented by way of example only, and alternative arrangements can be used in other embodiments. For example, the functionality associated with modules 112, 114 and 116 in other embodiments can be combined into a single module, or separated across a larger number of modules. As another example, multiple distinct processors can be used to implement different ones of modules 112, 114 and 116 or portions thereof.

At least portions of modules 112, 114 and 116 may be implemented at least in part in the form of software that is stored in memory and executed by a processor.

It is to be understood that the particular set of elements shown in FIG. 1 for AI-based redundancy management involving client devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, two or more of AI-based redundancy management framework 105, redundancy-related database 106, and web application(s) 110 can be on and/or part of the same processing platform.

An exemplary process utilizing modules 112, 114 and 116 of an example AI-based redundancy management framework 105 in computer network 100 will be described in more detail with reference to the flow diagram of FIG. 5.

Accordingly, at least one example embodiment includes enterprise fault tolerance and redundancy management using a stochastic neural network and/or a restricted Boltzmann machine. Such an embodiment includes implementing an IoT-based solution with predictive learning as well as stochastic and generative neural networks to predict failure of one or more hardware components. Additionally, such an embodiment includes determining, based at least in part on the prediction(s), one or more preferred hardware components (either attached or existing on-site in a parts locker, for example) to failover until a dispatch is carried out and one or more new and/or replacement components are obtained. As used herein, failover refers to transitioning to a redundant hardware component in response to a failure or termination of a previously active hardware component. As also used herein, a "hardware component" can include, by way merely of example, a processor, storage drive, memory, etc., and can also more generally refer to a component that includes one or more of hardware, software, and firmware.

A framework such as detailed herein in accordance with one or more embodiments can include a parts failure prediction engine which uses at least one of a naïve Bayes classifier algorithm (e.g., a Bernoulli naïve Bayes classifier) and a supervised learning model, and trains such classifiers and/or models using historical data pertaining to telemetry information from the given system and/or related sensor data (e.g., logs, error data, alert information, etc.), product data, and/or manufacturing information to accurately predict one or more subsequent hardware component failures.

Also, in at least one embodiment, such a framework includes a parts recommendation engine which uses a restricted Boltzmann machine to generate at least one recommendation for at least one hardware component to failover in case of an unexpected failure and/or a predicted failure. The parts recommendation engine can use historical service data, hardware component dispatch information, product data, and/or supply chain data to train the restricted Boltzmann machine for predicting appropriate hardware components. As further detailed herein, a restricted Boltzmann machine in such an embodiment can utilize at least one stochastic neural network.

In one or more embodiments, at least one IoT client device with one or more embedded sensors captures system information such as, for example, resource utilization, errors, logs, system alerts, etc., and passes such information to a cloud-based IoT server for processing as well as learning for predictions. At the cloud-based IoT server, a parts failure prediction engine utilizes a Bernoulli-based naïve Bayes classifier and/or a probabilistic supervised machine learning algorithm that uses binary classifiers to calculate the (posterior) probability of a failure based at least in part on prior probabilities (e.g., probabilities that an error has occurred), including a determined likelihood value.

Also, in at least one embodiment, the parts failure prediction engine can, based at least in part on the generated prediction(s), send one or more notifications to a CRM system for proactive case and dispatch functions. Additionally or alternatively, if the generated prediction pertains to a customer replaceable unit (CRU), the hardware component(s) will be dispatched, or a notification will be sent to an on-site parts locker for selection of the appropriate component(s). If the generated prediction pertains to a field replaceable unit (FRU), the same actions as detailed above can be taken, but with the inclusion of an additional step of dispatching at least one field technician. In the case of a significant and/or catastrophic failure, the parts failure prediction engine can, for example, notify the relevant client device(s) to automatically switch to at least one redundant standby hardware component (as recommended, for example, by the recommendation engine of the framework).

Figure 2:
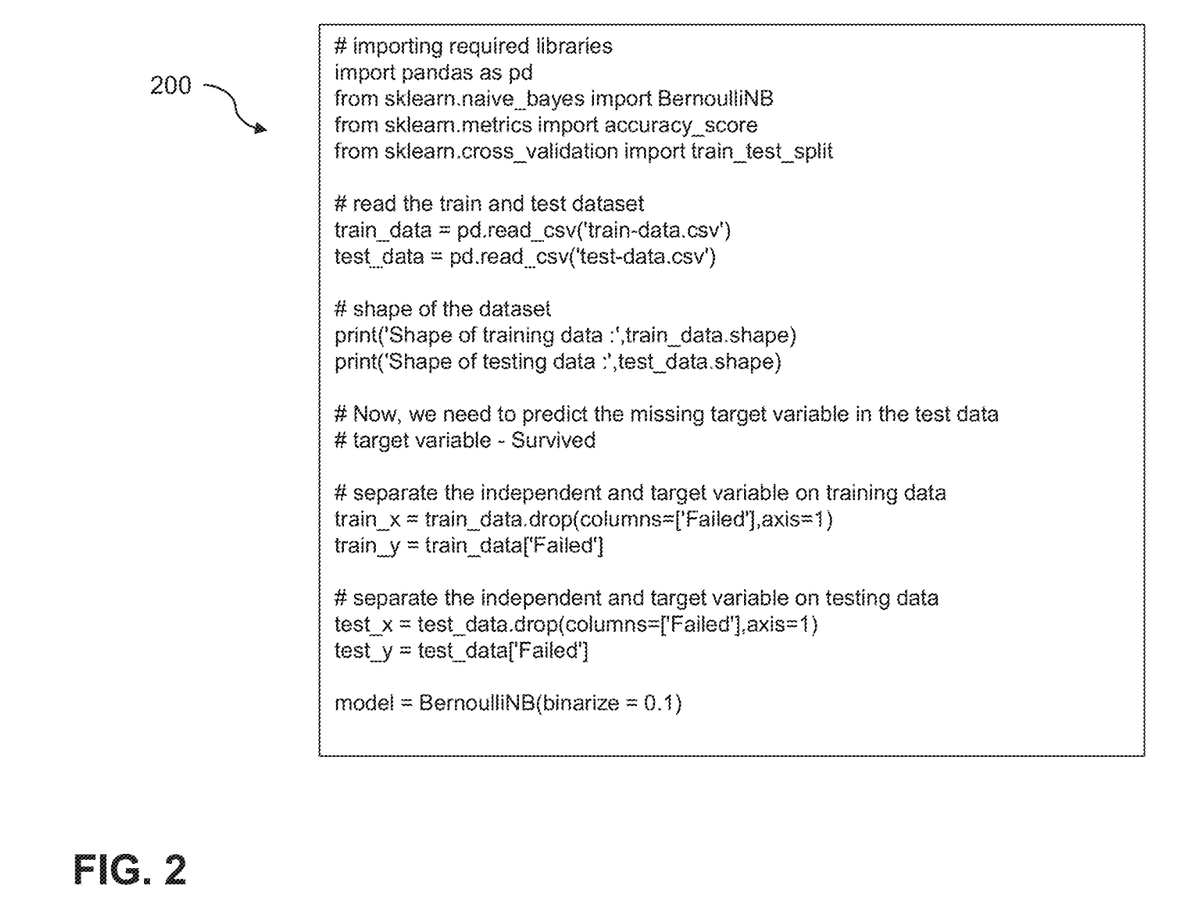
FIG. 2 shows an example code snippet for implementing a parts failure prediction engine in an illustrative embodiment.

As further detailed herein, one or more embodiments include using multiple machine learning models, including a shallow learning algorithm (e.g., a Bernoulli naïve Bayes classifier), to predict the failure of one or more parts or components of a system, as illustrated, for example, in FIG. 2. Such an embodiment additionally includes using a deep learning method (e.g., a restricted Boltzmann machine) to recommend the part(s) or component(s) to be used for optimized process efficiency, as illustrated, for example, in FIG. 4.

Accordingly, FIG. 2 shows an example code snippet for implementing a parts failure prediction engine in an illustrative embodiment. In this embodiment, example code snippet 200 is executed by or under the control of at least one processing system and/or device. For example, the example code snippet 200 may be viewed as comprising a portion of a software implementation of at least part of AI-based redundancy management framework 105 of the FIG. 1 embodiment.

The example code snippet 200 illustrates the use of Python and SciKitLearn libraries to implement a Bernoulli naïve Bayes classifier for predicting the failure of a part or component in a system based on behavior data. In this example code snippet 200, Jupyter Notebook is used as the integrated development environment (IDE) to develop and test the code, and Pandas is used for data manipulation. The code snippet 200 creates and separates a dataset into separate training and testing groups (e.g., 80% in a training group and 20% in a testing group) before using the dataset in the code.

As also depicted in FIG. 2, the libraries (Pandas, SciKitLearn, etc.) are imported, training data and testing data are read from the files and uploaded using a Pandas library, and initial data preprocessing is carried out. Additionally, a Bernoulli naïve Bayes classifier model is configured by calling a SciKitLearn library, and the Bernoulli naïve Bayes classifier model is trained by passing the training data. After the model is trained, the model is asked for a prediction using the test data, and an accuracy score of this prediction is calculated.

It is to be appreciated that this particular example code snippet shows just one example implementation of at least a portion of a parts failure prediction engine, and alternative implementations of the process can be used in other embodiments.

As also detailed herein, in at least one embodiment, a parts recommendation engine uses at least one stochastic neural network (e.g., a restricted Boltzmann machine), which is implemented for optimizing recommendations by introducing random (i.e., stochastic) variations into the neural network.

Figure 3:
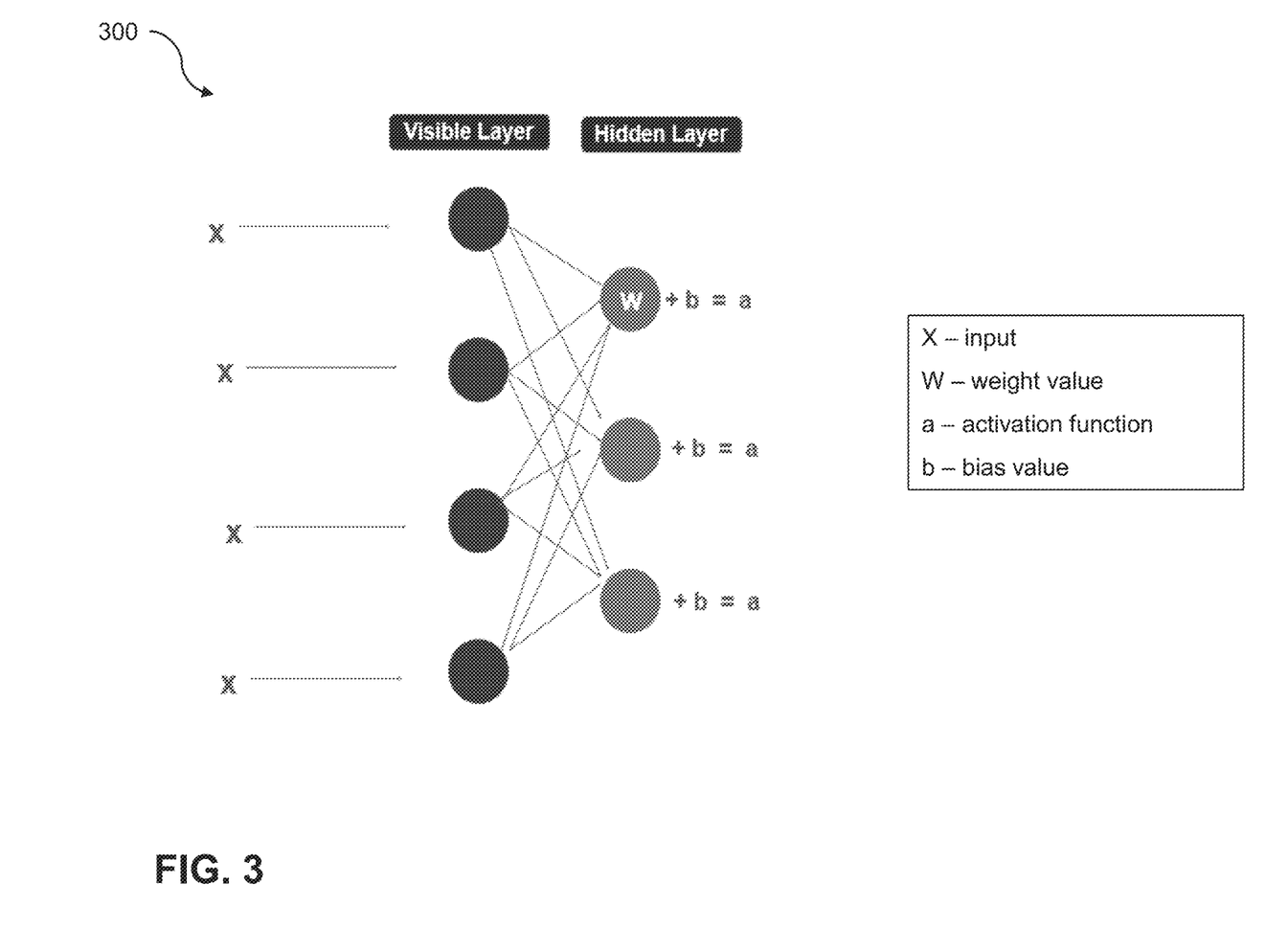
FIG. 3 shows an example restricted Boltzmann machine in an illustrative embodiment.

FIG. 3 shows an example restricted Boltzmann machine in an illustrative embodiment. By way of illustration, FIG. 3 depicts a restricted Boltzmann machine 300 that includes two layers: one layer of visible units (also referred to as neurons) and one layer of hidden units. In this example embodiment, the units in a given layer do not have connections between them, but are connected to at least a portion of the units in the other layer. The connection between such units is bi-directional and symmetric.

As used and detailed herein, a restricted Boltzmann machine refers to a generative neural network used for feature learning and classifications. Restricted Boltzmann machines are derived from a family of algorithms referred to as Boltzmann Machines, which are two-layered neural networks, and wherein the two layers include an input or visible layer and a hidden layer. As shown in FIG. 3, restricted Boltzmann machines are restricted in terms of connections between input/visible layers and hidden layers. Both layers are connected by a bi-partite graph, which indicates, in this example embodiment, that every node in the visible layer is connected with every node in hidden layer, but no two nodes in the same layer are connected to each other. Accordingly, there is no intra-layer connection. This restriction makes the algorithm more efficient from training and prediction perspectives.

In an example restricted Boltzmann machine such as depicted in FIG. 3, each node is a locus of computation that processes input and begins by making stochastic (i.e., randomly-derived) decisions about whether to transmit that input in the network or not. Each visible node takes a low-level feature (for example, parts configuration) from the training dataset for learning, and different nodes will handle different features from the training data. The input value (X) depicted in the visible layer of FIG. 3, when passed to the hidden layer node(s), is multiplied by a weight value (W). The weight value (W) can include, for example, the number of connections between two layers (in the FIG. 3 example, that could be 4×3=12). A bias value (b) can also be added to the multiplied value, wherein bias represents a constant value which is added to the output of a node in a neural network to improve the capacity of the network to solve problems. The result of this computation (i.e., X*W+b) is passed to an activation function (for example, a sigmoid function) to produce one output for each hidden layer node. This activation function (e.g., a sigmoid function) determines whether to activate (i.e., turn on) or not, thus adding non-linearity to the network.

In accordance with such an example embodiment, hardware component configuration data and dispatch data are used to train the restricted Boltzmann machine in a process referred to herein as contrastive divergence learning. The trained restricted Boltzmann machine can then be implemented to predict and recommend at least one appropriate hardware component for a component that has already failed or has been predicted to fail.

As noted above, contrastive divergence refers to a method used to calculate a gradient (i.e., a slope representing the relationship between a network's weights and its error), which is important for learning functions. In situations wherein a function or set of probabilities cannot be evaluated directly, some form of an inference model is implemented to approximate the algorithm's learning gradient and determine which direction to move towards (e.g., to reduce the difference between the actual value and the predicted value). This can be seen, for example, in restricted Boltzmann machines, wherein contrastive divergence can be computed randomly. Such a technique is used to teach restricted Boltzmann machines how to activate their hidden layer nodes appropriately, then to adjust their trigger parameters based upon input feedback, and to continually repeat this dimension reduction process.

Figure 4:
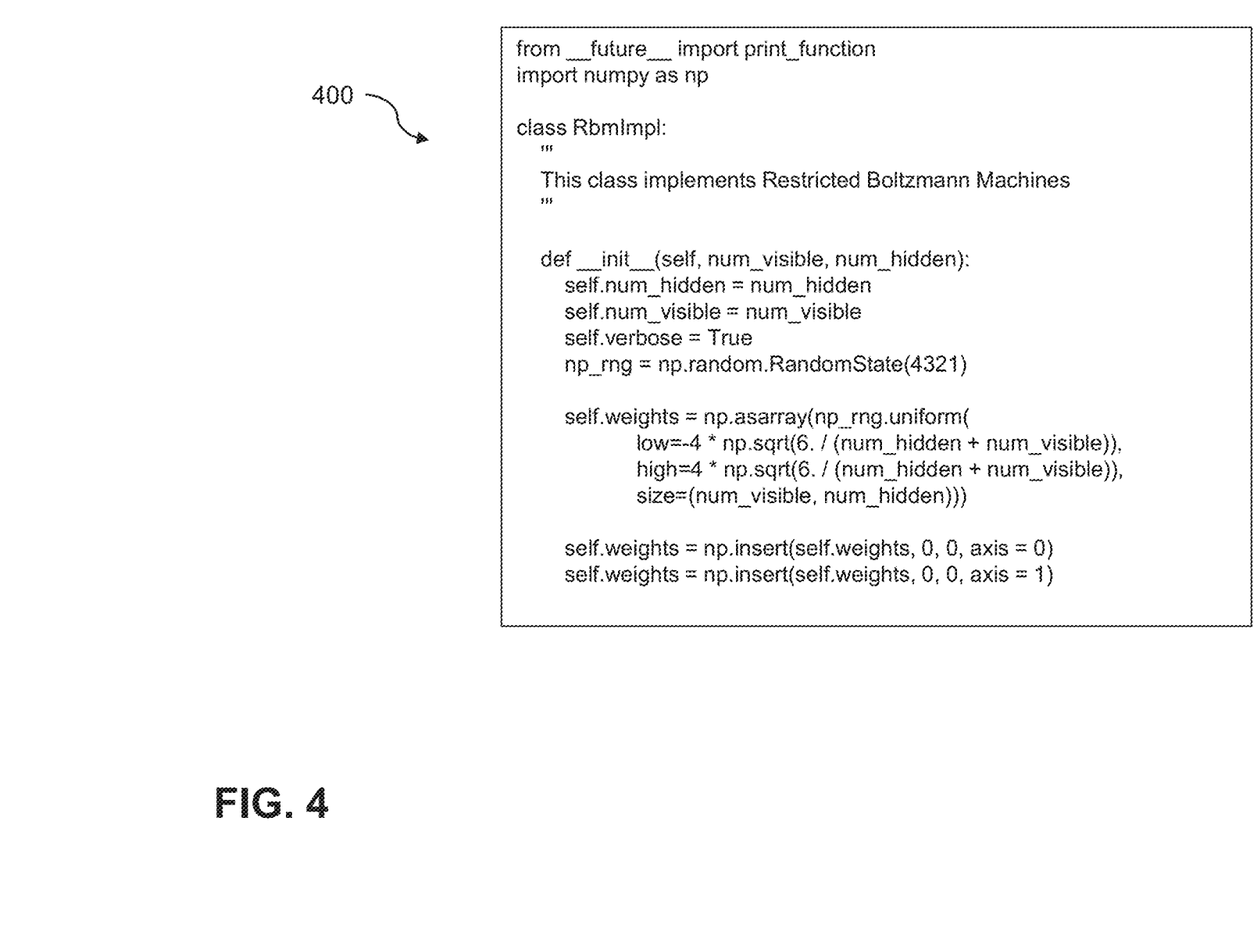
FIG. 4 shows an example code snippet for implementing a parts recommendation engine in an illustrative embodiment.

FIG. 4 shows an example code snippet for implementing a parts recommendation engine in an illustrative embodiment. In this embodiment, example code snippet 400 is executed by or under the control of at least one processing system and/or device. For example, the example code snippet 400 may be viewed as comprising a portion of a software implementation of at least part of AI-based redundancy management framework 105 of the FIG. 1 embodiment.

The example code snippet 400 illustrates implementation of a restricted Boltzmann machine (noted in code snippet 400 as RBM). The example code snippet 400 uses Python to implement the restricted Boltzmann machine for recommending the most optimized part or component for the given system. Additionally, as illustrated in FIG. 4, Jupyter Notebook is used as the IDE to develop and test the code, and Pandas is used for data manipulation. Further, example code snippet 400 illustrates defining the number of visible and hidden nodes, as well as the weight(s) used within the restricted Boltzmann machine. Example code snippet 400 also depicts training the restricted Boltzmann machine and defining the sigmoid function to be used in conjunction therewith.

It is to be appreciated that this particular example code snippet shows just one example implementation of at least a portion of a parts recommendation engine, and alternative implementations of the process can be used in other embodiments.

Accordingly, as detailed herein, one or more embodiments include utilizing a combination of artificial intelligence algorithms to predict one or more hardware component failures within at least one system, and recommend one or more appropriate redundant (e.g., standby) hardware components to implement and/or initiate provision of a replacement of the one or more hardware components (e.g., if the recommended component(s) is/are not available as an attached standby). Such an embodiment can include classifying the recommended component(s) as redundant (e.g., available on standby), CRU, or FRU. Additionally, while a hardware component is being replaced, at least one embodiment includes calculating the remaining lifespan of the redundant hardware component and/or the next dispatch date. Such temporal calculations can be monitored and modified, if needed, based at least in part on ongoing analysis of system telemetry data, system environment information, one or more component-related internal and external factors, etc.

Figure 5:
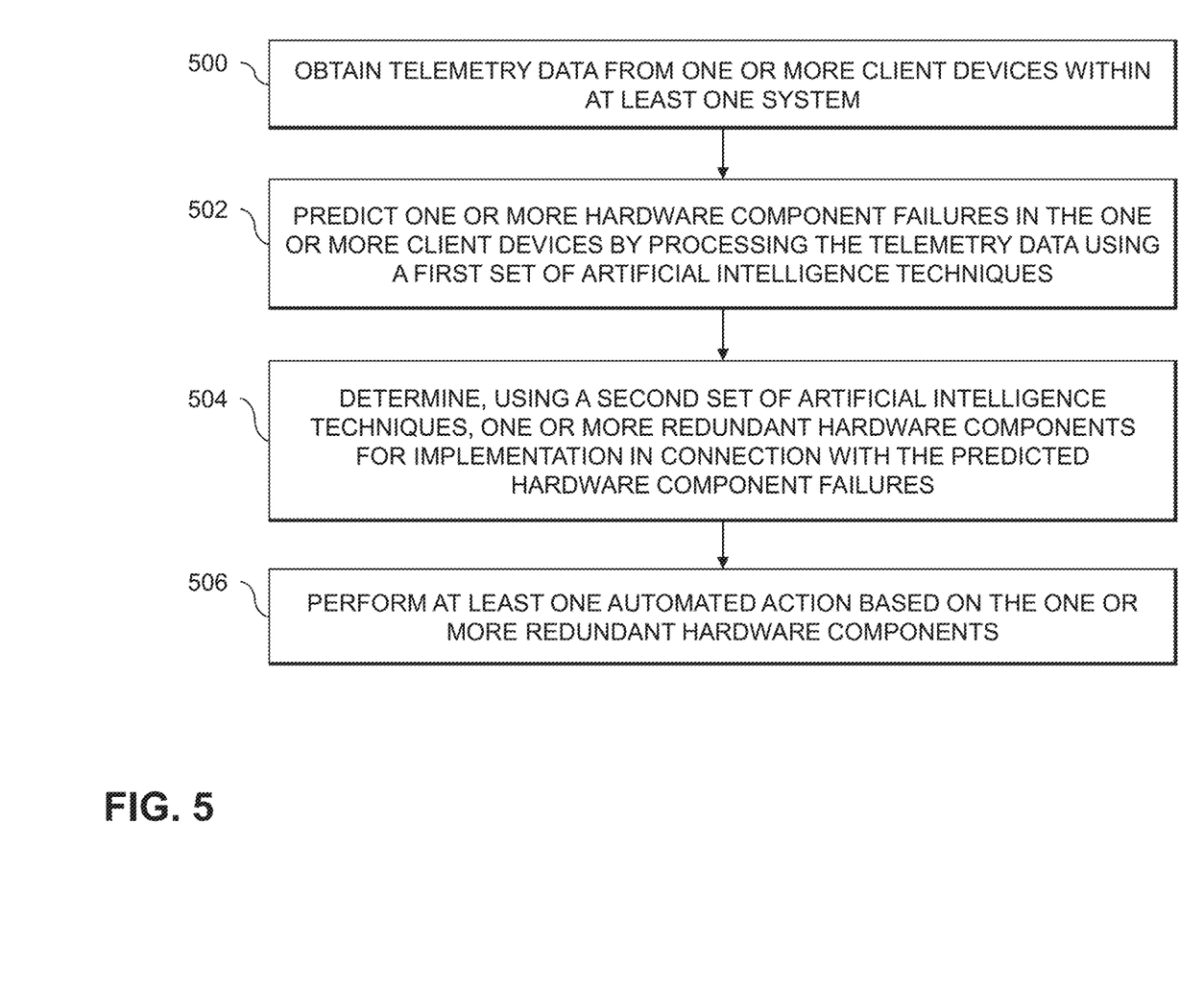
FIG. 5 is a flow diagram of a process for AI-based redundancy management in an illustrative embodiment.

FIG. 5 is a flow diagram of a process for AI-based redundancy management in an illustrative embodiment. It is to be understood that this particular process is only an example, and additional or alternative processes can be carried out in other embodiments.

In this embodiment, the process includes steps 500 through 506. These steps are assumed to be performed by the AI-based redundancy management framework 105 utilizing its modules 112, 114 and 116.

Step 500 includes obtaining telemetry data from one or more client devices within at least one system. In one or more embodiments, the telemetry data include resource utilization data derived from the at least one system, information pertaining to errors within the at least one system, log information derived from the at least one system, and/or system alerts related to the at least one system.

Step 502 includes predicting one or more hardware component failures in at least a portion of the one or more client devices within the at least one system by processing at least a portion of the telemetry data using a first set of one or more AI techniques. In at least one embodiment, the first set of one or more AI techniques includes at least one of a naïve Bayes classifier algorithm (e.g., a Bernoulli naïve Bayes classifier) and a supervised machine learning model. Such an embodiment can also include training the first set of one or more AI techniques using historical telemetry data pertaining to the at least one system, sensor data related to the at least one system, product data pertaining to the at least one system, and/or manufacturing information related to the at least one system.

Step 504 includes determining, using a second set of one or more AI techniques, one or more redundant hardware components for implementation in connection with the one or more predicted hardware component failures. In at least one embodiment, the second set of one or more AI techniques includes at least one of a restricted Boltzmann machine and a stochastic neural network. In such an embodiment, the restricted Boltzmann machine includes a first layer of one or more visible units and a second layer of one or more hidden units, wherein the one or more units in each layer are not connected within the layer, and wherein the one or more units in each layer are connected to at least a portion of the one or more units in the other layer. Additionally or alternatively, such an embodiment can include training the second set of one or more AI techniques using historical service data related to the at least one system, hardware component dispatch information, product data pertaining to the at least one system, hardware component configuration data, and/or supply chain data related to the at least one system.

Step 506 includes performing at least one automated action based at least in part on the one or more redundant hardware components. In at least one embodiment, performing the at least one automated action can include initiating provision of a replacement of at least a portion of the one or more determined redundant hardware components to at least a portion of the one or more client devices within the at least one system; outputting one or more notifications, related to at least one of the one or more predicted hardware component failures and the one or more redundant hardware components, to at least one customer relationship management system; classifying each of the one or more redundant hardware components as one of a customer replaceable unit and a field replaceable unit; and/or instructing at least one of the one or more client devices within the at least one system to automatically transition to at least one of the one or more redundant hardware components.

The techniques depicted in FIG. 5 can also include calculating a remaining lifespan of the one or more redundant hardware components based at least in part on analysis of additional telemetry data, system environment information, one or more component-related internal factors, and/or one or more component-related external factors.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically determine and manage appropriate redundancies for hardware components of a system. These and other embodiments can effectively improve the performance of the system and reduce the risk of hardware component failure and/or data loss, as well as improving service level agreement (SLA) compliance and reducing warranty costs for system components.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
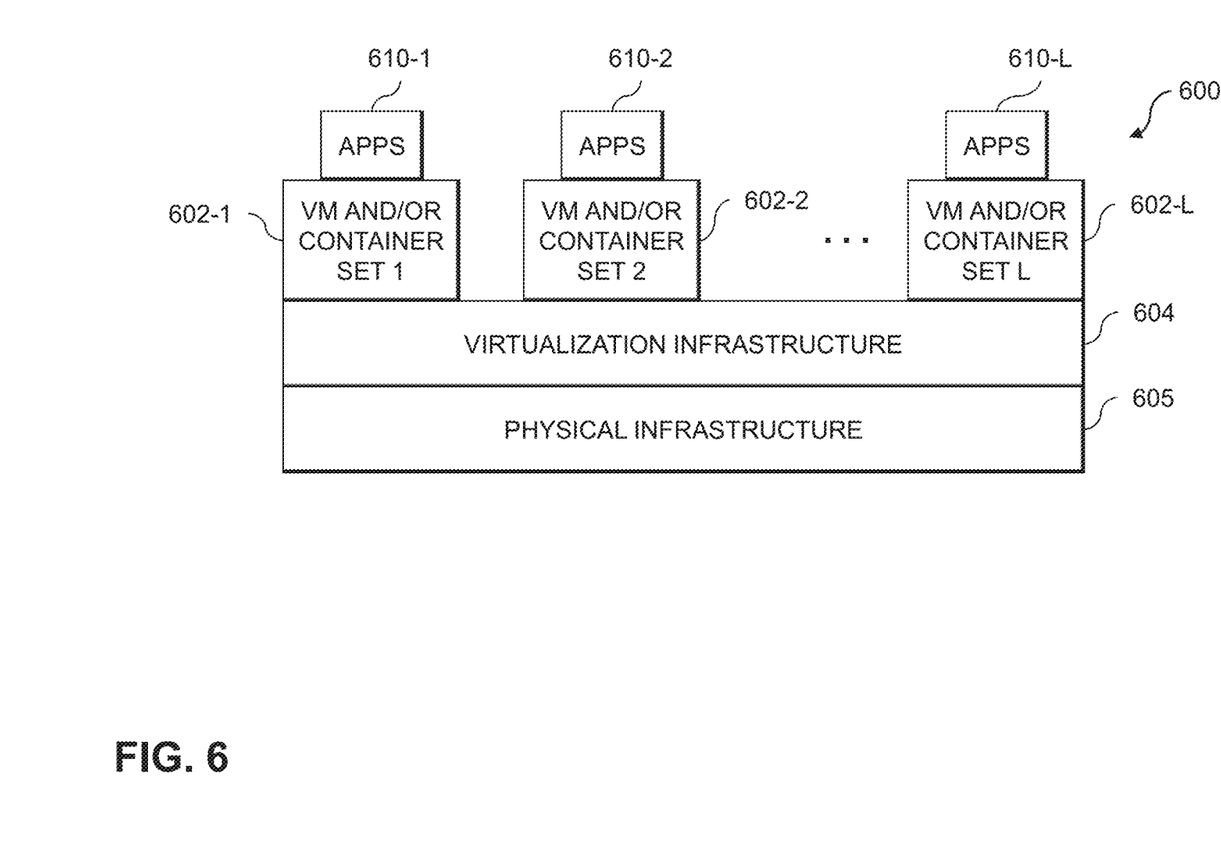
FIGS. 6 and 7 show examples of processing platforms that may be utilized to implement at least a portion of an information processing system in illustrative embodiments.
Figure 7:
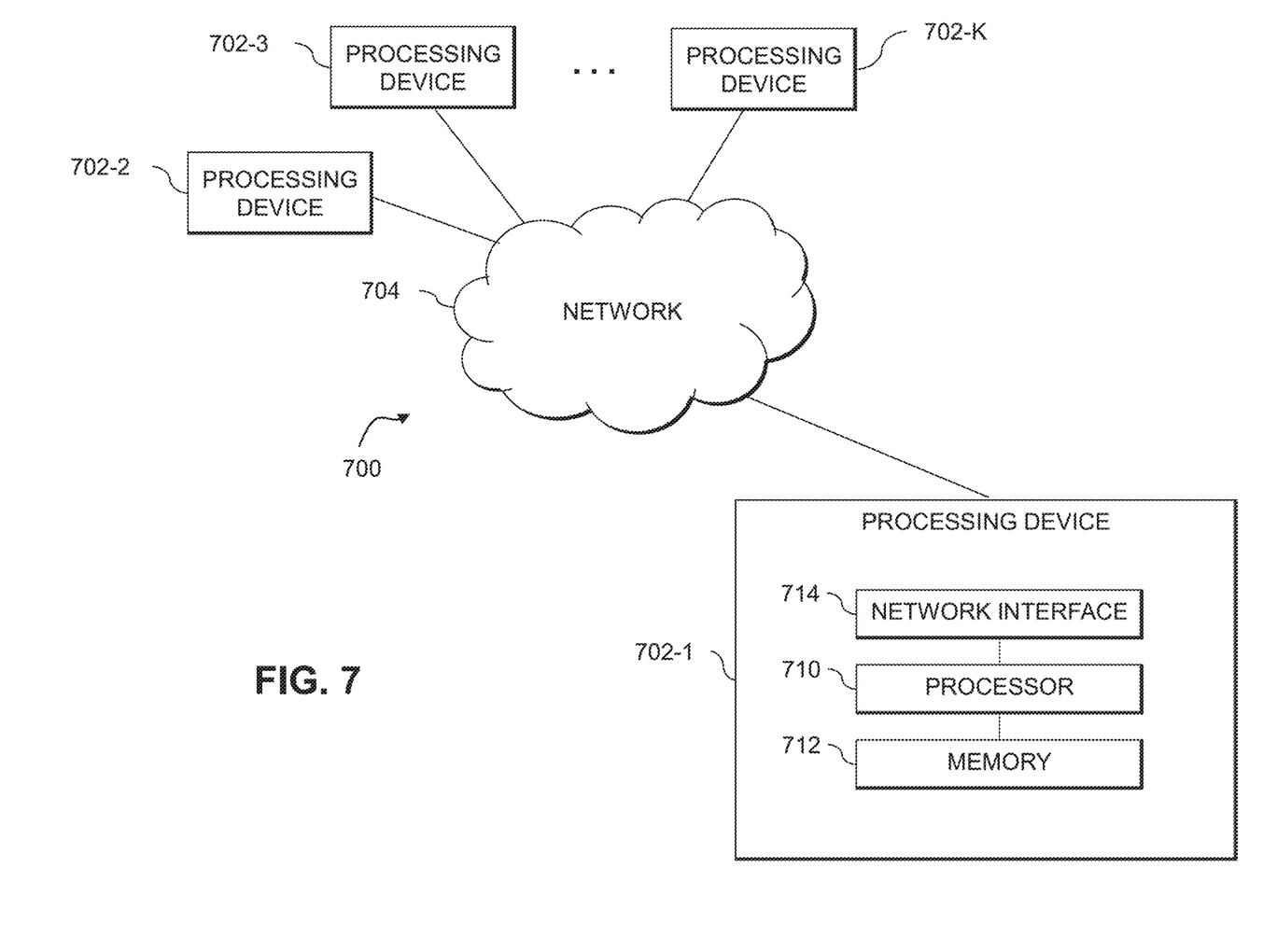

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604, wherein the hypervisor platform has an associated virtual infrastructure management system. The underlying physical machines comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 comprises a microprocessor, a microcontroller, an application-specific integrated circuit (ASIC), a field-programmable gate array (FPGA) or other type of processing circuitry, as well as portions or combinations of such circuitry elements.

The memory 712 comprises random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining telemetry data from one or more client devices within at least one system;
predicting one or more hardware component failures in at least a portion of the one or more client devices within the at least one system by processing at least a portion of the telemetry data using a first set of one or more artificial intelligence techniques;
determining, using a second set of one or more artificial intelligence techniques, one or more redundant hardware components for implementation in connection with the one or more predicted hardware component failures; and
performing at least one automated action based at least in part on the one or more redundant hardware components, wherein performing the at least one automated action comprises classifying at least a given one of the one or more redundant hardware components as one of a customer replaceable unit and a field replaceable unit; wherein the method is performed by at least one processing device comprising a processor coupled to a memory.

2. The computer-implemented method of claim 1, wherein the first set of one or more artificial intelligence techniques comprises at least one of a naïve Bayes classifier algorithm and a supervised machine learning model.

3. The computer-implemented method of claim 2, wherein the naïve Bayes classifier algorithm comprises a Bernoulli naïve Bayes classifier.

4. The computer-implemented method of claim 1, further comprising:
training the first set of one or more artificial intelligence techniques using one or more of historical telemetry data pertaining to the at least one system, sensor data related to the at least one system, product data pertaining to the at least one system, and manufacturing information related to the at least one system.

5. The computer-implemented method of claim 1, wherein the second set of one or more artificial intelligence techniques comprises at least one of a restricted Boltzmann machine and a stochastic neural network.

6. The computer-implemented method of claim 5, wherein the restricted Boltzmann machine comprises a first layer of one or more visible units and a second layer of one or more hidden units, wherein the one or more units in each layer are not connected within the layer, and wherein the one or more units in each layer are connected to at least a portion of the one or more units in the other layer.

7. The computer-implemented method of claim 1, further comprising:
training the second set of one or more artificial intelligence techniques using one or more of historical service data related to the at least one system, hardware component dispatch information, product data pertaining to the at least one system, hardware component configuration data, and supply chain data related to the at least one system.

8. The computer-implemented method of claim 1, wherein performing the at least one automated action comprises initiating provision of a replacement of at least a portion of the one or more determined redundant hardware components to at least a portion of the one or more client devices within the at least one system.

9. The computer-implemented method of claim 1, wherein performing the at least one automated action comprises outputting one or more notifications, related to at least one of the one or more predicted hardware component failures and the one or more redundant hardware components, to at least one customer relationship management system.

10. The computer-implemented method of claim 1, wherein the one or more redundant hardware components comprise multiple redundant hardware components, and wherein performing the at least one automated action comprises classifying each of a plurality of the multiple redundant hardware components as one of a customer replaceable unit and a field replaceable unit.

11. The computer-implemented method of claim 1, wherein performing the at least one automated action comprises instructing at least one of the one or more client devices within the at least one system to automatically transition to at least one of the one or more redundant hardware components.

12. The computer-implemented method of claim 1, further comprising:
calculating a remaining lifespan of the one or more redundant hardware components based at least in part on analysis of one or more of additional telemetry data, system environment information, one or more component-related internal factors, and one or more component-related external factors.

13. The computer-implemented method of claim 1, wherein the telemetry data comprise one or more of resource utilization data derived from the at least one system, information pertaining to errors within the at least one system, log information derived from the at least one system, and system alerts related to the at least one system.

14. A non-transitory processor-readable storage medium having stored therein program code of one or more software programs, wherein the program code when executed by at least one processing device causes the at least one processing device:
to obtain telemetry data from one or more client devices within at least one system;
to predict one or more hardware component failures in at least a portion of the one or more client devices within the at least one system by processing at least a portion of the telemetry data using a first set of one or more artificial intelligence techniques;
to determine, using a second set of one or more artificial intelligence techniques, one or more redundant hardware components for implementation in connection with the one or more predicted hardware component failures; and
to perform at least one automated action based at least in part on the one or more redundant hardware components, wherein performing the at least one automated action comprises classifying at least a given one of the one or more redundant hardware components as one of a customer replaceable unit and a field replaceable unit.

15. The non-transitory processor-readable storage medium of claim 14, wherein the first set of one or more artificial intelligence techniques comprises at least one of a naïve Bayes classifier algorithm and a supervised machine learning model.

16. The non-transitory processor-readable storage medium of claim 14, wherein the second set of one or more artificial intelligence techniques comprises at least one of a restricted Boltzmann machine and a stochastic neural network, and wherein the restricted Boltzmann machine comprises a first layer of one or more visible units and a second layer of one or more hidden units, wherein the one or more units in each layer are not connected within the layer, and wherein the one or more units in each layer are connected to at least a portion of the one or more units in the other layer.

17. The non-transitory processor-readable storage medium of claim 14, wherein performing the at least one automated action comprises initiating provision of a replacement of at least a portion of the one or more determined redundant hardware components to at least a portion of the one or more client devices within the at least one system.

18. An apparatus comprising:
at least one processing device comprising a processor coupled to a memory;
the at least one processing device being configured:
to obtain telemetry data from one or more client devices within at least one system;
to predict one or more hardware component failures in at least a portion of the one or more client devices within the at least one system by processing at least a portion of the telemetry data using a first set of one or more artificial intelligence techniques;

to determine, using a second set of one or more artificial intelligence techniques, one or more redundant hardware components for implementation in connection with the one or more predicted hardware component failures; and to perform at least one automated action based at least in part on the one or more redundant hardware components, wherein performing the at least one automated action comprises classifying at least a given one of the one or more redundant hardware components as one of a customer replaceable unit and a field replaceable unit.

19. The apparatus of claim 18, wherein the first set of one or more artificial intelligence techniques comprises at least one of a naïve Bayes classifier algorithm and a supervised machine learning model.

20. The apparatus of claim 18, wherein the second set of one or more artificial intelligence techniques comprises at least one of a restricted Boltzmann machine and a stochastic neural network, and wherein the restricted Boltzmann machine comprises a first layer of one or more visible units and a second layer of one or more hidden units, wherein the one or more units in each layer are not connected within the layer, and wherein the one or more units in each layer are connected to at least a portion of the one or more units in the other layer.

* * * * *